(12) United States Patent
Kusume et al.

(10) Patent No.: US 7,261,934 B2
(45) Date of Patent: Aug. 28, 2007

(54) POLYESTER FILM

(75) Inventors: Hiroshi Kusume, Gifu (JP); Atsushi Oyamatsu, Gifu (JP); Tetsuo Yoshida, Gifu (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 10/571,094

(22) PCT Filed: May 27, 2004

(86) PCT No.: PCT/JP2004/007637

§ 371 (c)(1), (2), (4) Date: Mar. 8, 2006

(87) PCT Pub. No.: WO2005/026241

PCT Pub. Date: Mar. 24, 2005

(65) Prior Publication Data

US 2006/0263592 A1    Nov. 23, 2006

(30) Foreign Application Priority Data

Sep. 11, 2003  (JP)  ............................ 2003-319372

(51) Int. Cl.
  B32B 27/18  (2006.01)
  B32B 27/20  (2006.01)
  B32B 27/36  (2006.01)

(52) U.S. Cl. .................. 428/212; 428/323; 428/327; 428/328; 428/329; 428/330; 428/331; 428/480; 428/332; 428/337; 428/338; 428/339

(58) Field of Classification Search .................. None
See application file for complete search history.

(56) References Cited

U.S. PATENT DOCUMENTS

| | | | | |
|---|---|---|---|---|
| 5,180,658 A | * | 1/1993 | Kiyohara et al. | 430/533 |
| 5,372,879 A | * | 12/1994 | Handa et al. | 428/327 |
| 5,422,175 A | * | 6/1995 | Ito et al. | 428/304.4 |
| 5,672,409 A | * | 9/1997 | Miyakawa et al. | 428/141 |
| 5,843,578 A | * | 12/1998 | Sasaki et al. | 428/483 |
| 6,004,664 A | * | 12/1999 | Sasaki et al. | 428/314.2 |
| 6,150,012 A | * | 11/2000 | Matsui et al. | 428/216 |
| 6,383,983 B1 | * | 5/2002 | Sasaki et al. | 503/227 |
| 6,984,322 B2 | * | 1/2006 | Suh et al. | 210/502.1 |
| 2001/0036545 A1 | * | 11/2001 | Nishi et al. | 428/315.7 |
| 2002/0004129 A1 | * | 1/2002 | Hibiya et al. | 428/315.7 |
| 2003/0228430 A1 | * | 12/2003 | Tanaka et al. | 428/32.39 |

FOREIGN PATENT DOCUMENTS

| | | |
|---|---|---|
| JP | 59-012952 | 1/1984 |
| JP | 63-62104 | 3/1988 |
| JP | 03-178421 A | 8/1991 |
| JP | 2002-098808 | 4/1992 |
| JP | 4-153232 A | 5/1992 |
| JP | 04-239540 | 8/1992 |
| JP | 06-322153 A | 11/1994 |
| JP | 09-314688 | * 12/1997 |
| JP | 10-176072 | * 6/1998 |
| JP | 11-000949 | * 1/1999 |
| JP | 11-000949 A | 1/1999 |
| JP | 11-034263 | 2/1999 |
| JP | 11-034263 A | 2/1999 |
| JP | 11-161756 | 6/1999 |
| JP | 11-161756 A | 6/1999 |
| JP | 2002-080620 | 3/2002 |
| JP | 2002-080620 A | 3/2002 |
| JP | 2002-098808 A | 4/2002 |
| JP | 2002-137350 | 5/2002 |
| JP | 2002-137350 A | 5/2002 |
| JP | 2002-138150 | 5/2002 |
| JP | 2002-138150 A | 5/2002 |
| JP | 2003-178421 | 6/2003 |
| JP | 2004-050479 | 2/2004 |
| JP | 2004-050479 A | 2/2004 |
| JP | 2004-126345 | 4/2004 |
| JP | 2004-126345 A | 4/2004 |
| JP | 2004-176042 | 6/2004 |
| JP | 2004-176042 A | 6/2004 |

* cited by examiner

Primary Examiner—Vivian Chen
(74) Attorney, Agent, or Firm—Sughrue Mion, PLLC

(57) ABSTRACT

There is provided a white polyester film which retains practically satisfactory reflectivity with respect to the visible light range, can undergo stable film production even when inorganic fine particles are added in high concentration and is stable against a dimensional change caused by heat generated from a light source. The polyester film is a polyester film which comprises a composition comprising a copolyester and 30 to 50 wt % of inorganic fine particles based on the composition, shows a thermal shrinkage at 85° C. in longitudinal and transverse directions of not higher than 0.7% and a thermal shrinkage at 150° C. in the longitudinal and transverse directions of not higher than 5.0%, and shows an average reflectance at a wavelength of 400 to 700 nm of not lower than 90%.

11 Claims, No Drawings

POLYESTER FILM

TECHNICAL FIELD

This invention relates to a polyester film. More specifically, it relates to a white polyester film, particularly a white polyester film which is suitably used as a reflecting plate.

BACKGROUND ART

A white polyester film is widely used as a base material of a printing record reception sheet for ink-jet printing, thermal printing, offset printing or the like. This white polyester film is generally produced by having a polyester contain inorganic fine particles or an incompatible resin.

In recent years, due to improvements in printing precision and the sharpness of a printed material, a white polyester film which appears more sophisticated has been demanded. To fulfill the demand, a white polyester film resulting from adding two or more types of inorganic fine particles to a polyester and a white polyester film resulting from adding a combination of inorganic fine particles and incompatible resin to a polyester are proposed in JP-A 4-153232 (the term "JP-A" as used herein means an "unexamined published Japanese patent application") and JP-A 6-322153. However, these techniques are also subjected to demand for further improvements in sharpness and fanciness. Particularly, in an internally illuminating billboard used for displaying the name of a store such as a convenience store or advertising merchandises, the number of fluorescent lamps as light sources is increased to increase the brightness of the surface of the billboard to 1,000 lux or higher, or colorful neon tubes are used to make a design drawn on the billboard more noticeable, so as to increase an advertising effect. The internally illuminating billboard uses a reflecting plate for increasing illuminance. Further, for liquid crystal displays that have generally employed a backlight system which sheds light from the back of the display in lighting the display surface, a sidelight system as described in JP-A 63-62104 has been increasingly widely used owing to an advantage that it can be thin and light the display surface uniformly. The sidelight system is a system which sheds light of cold cathode tubes or the like from the edges of an acrylic plate or the like having a certain thickness. Because of dot printing, illuminating light is dispersed uniformly, and a screen having uniform brightness is obtained. According to the system, the display can be made thinner than that adopting the backlight system because lights are placed not at the back but at the edges of the screen.

To prevent illuminating light from entering the back of the screen, a reflecting plate must be placed on the back of the screen. The reflecting plate must be thin and have high light reflectance. As a white polyester film for a liquid crystal display reflecting plate which matches this purpose, a white polyester film containing titanium oxide is known because it is easy to handle and inexpensive. However, as described in JP-B 8-16175 (the term "JP-B" used herein means "Examined Japanese Patent Publication"), the white polyester film having mere addition of an incompatible resin or titanium oxide has a limitation on an improvement in reflectance, and it cannot be said that the brightness of the screen is satisfactory.

An improvement in reflection efficiency can be expected when inorganic particles such as titanium oxide are added in high concentration. However, for example, when 50 wt % of the inorganic particles are added, ruptures often occur and film formation becomes very difficult or even impossible in some cases due to the very high particle concentration. Further, as a realistic measure for decreasing the frequency of occurrence of the ruptures when the particle concentration is very high, it is conceived to copolymerize a polyester resin. In this case, however, the thermal shrinkage becomes very high, and only a film showing extremely poor thermal dimensional stability can be obtained.

DISCLOSURE OF THE INVENTION

An object of the present invention is to solve the above problems and provide a white polyester film which retains practically satisfactory reflectivity with respect to the visible light range, can undergo stable film production even when inorganic fine particles are added in high concentration and is stable against a dimensional change caused by heat generated from a light source.

Another object of the present invention is to provide a polyester film that has such properties as described above and is the most suitable for a base material for the back sheet of a solar battery or the reflecting plate of a liquid crystal display or internally illuminating billboard.

Other objects and advantages of the present invention will become apparent from the following description.

According to the present invention, firstly, the above objects and advantages of the present invention are achieved by a polyester film which comprises a composition comprising a copolyester and inorganic fine particles in an amount of 30 to 50% by weight based on the composition, the copolyester comprising terephthalic acid as a main dicarboxylic acid component, ethylene glycol as a main glycol component, and at least one selected from the group consisting of isophthalic acid, naphthalenedicarboxylic acid and cyclohexane dimethanol as a copolymerized component, which has a thermal shrinkage at 85° C. in longitudinal and transverse directions of not higher than 0.7% and a thermal shrinkage at 150° C. in the longitudinal and transverse directions of not higher than 5.0%, and which has an average reflectance at a wavelength of 400 to 700 nm of not lower than 90%.

By use of the above composition, a film containing inorganic fine particles in high concentration which has heretofore been very difficult to processed into a film by stretching can be produced stably, and a white polyester film having such properties as described above can be obtained.

BEST MODE FOR CARRYING OUT THE INVENTION

The polyester film of the present invention may be a single-layer film comprising a single layer or may be a laminated film comprising a plurality of layers.

The laminated film has at least one layer which comprises the above composition comprising the above copolymer and inorganic fine particles. For example, it may be a laminated film which comprises a layer comprising the above composition and a layer comprising a composition comprising the above copolyester and 0 to 30 wt % of inorganic fine particles based on the composition.

Copolyester

The above copolyester comprises terephthalic acid as a main dicarboxylic acid component, ethylene glycol as a main glycol component, and at least one selected from the group consisting of isophthalic acid, naphthalenedicarboxylic acid and cyclohexane dimethanol as a copolymerized component.

The proportion of the copolymerized component is preferably 1 to 30 mol %, more preferably 3 to 25 mol %, much more preferably 5 to 20 mol %, particularly preferably 7 to 15 mol %, based on all dicarboxylic acid components or all diol components. When the proportion is lower than 1 mol %, the stretch stress of the layer containing inorganic fine particles becomes high, thereby making film production impossible in some cases. Meanwhile, when the proportion is higher than 30 mol %, thermal dimensional stability becomes poor and production of the film becomes difficult.

As described above, the copolymerized component is isophthalic acid, naphthalenedicarboxylic acid such as 2,6-naphthalenedicarboxylic acid, or cyclohexane dimethanol such as 1,4-cyclohexane dimethanol. It is preferable to use such a copolyester because even a composition containing inorganic fine particles in high concentration can be processed into a film stably. The melting point of the copolyester is preferably not higher than 250° C., more preferably not higher than 245° C., particularly preferably not higher than 240° C.

Inorganic Fine Particles

Inorganic fine particles are contained in an amount of 30 to 50 wt % based on the composition. When the amount of the inorganic fine particles is smaller than 30 wt %, satisfactory light reflectance and whiteness are difficult to achieve. Meanwhile, when the amount is larger than 50 wt %, a breakage is liable to occur during film production.

The average particle diameter of the inorganic fine particles is preferably 0.1 to 3.0 µm, more preferably 0.2 to 2.5 µm, particularly preferably 0.3 to 2.0 µm. When it is smaller than 0.1 µm, dispersibility degrades extremely and agglomeration of the particles occurs, so that troubles are liable to occur during the production process, coarse protrusions are formed on the film, and the film may have poor gloss disadvantageously. When it is larger than 3.0 µm, the surface of the film becomes coarse, and the gloss of the film deteriorates disadvantageously. As the inorganic fine particles, barium sulfate, titanium oxide, calcium carbonate or silicon dioxide is preferred, for example. These can be used alone or in combination of two or more. Illustrative examples of titanium oxide include rutile-type titanium oxide and anatase-type titanium oxide. Use of rutile-type titanium oxide is preferred because yellowing of the polyester film caused by light is little and a change in color difference can be controlled. Rutile-type titanium oxide is preferred since the degree of the gloss of the film can be improved when dispersibility thereof is improved by use of a fatty acid such as stearic acid or a derivative thereof. Further, it is preferred to use rutile-type titanium oxide after it has its particle diameters adjusted by use of a purification process to remove coarse particles before added to the polyester. As for industrial means in the purification process, a jet mill or a ball mill can be used as milling means, and a dry or wet centrifuge can be used as classification means, for example. These means may be used in combination of two or more, and rutile-type titanium oxide may be purified stepwise.

Illustrative examples of a method of incorporating the inorganic fine particles into the copolyester include the following methods, i.e., a method comprising the steps of producing master pellets containing a large quantity of the inert particles by a method of adding the particles before completion of the transesterification reaction or esterification reaction or before the start of the polycondensation reaction at the time of synthesis of the copolyester or a method of adding the particles to the copolyester and then melt-kneading them, and kneading the master pellets with a copolyester containing no additives so as to have the copolyester contain a predetermined amount of the additive, and a method of using the above master pellets as they are.

When the above inorganic fine particles to be added at the time of synthesis of the copolyester are titanium oxide, titanium oxide is preferably added to the reaction system as a slurry having titanium oxide dispersed in glycol.

It is preferred that the number of coarse agglomerated particles in the inorganic fine particles in the copolyester be decreased. For this purpose, it is preferred to filter the molten copolymer composition by using a nonwoven filter comprising thin stainless steel wires having a wire diameter of not larger than 15 µm and having an average aperture size of preferably 10 to 100 µm, more preferably 20 to 50 µm, as a filter at the time of film production.

As described above, two or more types of inorganic fine particles may be used in combination. For instance, rutile-type titanium oxide may be used in combination with anatase-type titanium oxide. Further, titanium oxide may be used in combination with barium sulfate, calcium carbonate or silicon dioxide.

The copolyester composition may contain a fluorescent whitening agent or an ultraviolet absorber. When the fluorescent whitening agent is contained, the concentration thereof is preferably 0.005 to 0.2 wt %, more preferably 0.01 to 0.1 wt %, based on the composition. As the fluorescent whitening agent, OB-1 (product of Eastman Co., Ltd.), Uvitex-MD (product of Ciba Geigy) or JP-Conc (product of Nippon Chemical Works Co., Ltd.) can be used, for example.

When the content of the fluorescent whitening agent is lower than 0.005 wt %, an improvement in illuminance when the film is used in a reflecting plate is not sufficiently great and the effect achieved by adding the fluorescent whitening agent is weak, while when it is higher than 0.2 wt %, color peculiar to the fluorescent whitening agent appears disadvantageously.

The ultraviolet absorber is not limited to a particular type. However, it is preferred to use at least one compound selected from a cyclic imino ester and a cyclic imino ester in an unreacted form. As the cyclic imino ester, a compound known as an ultraviolet absorber per se such as those described in JP-Ak 59-12952 is used.

The ultraviolet absorber is added in an amount of preferably 0.1 to 5 wt %, more preferably 0.2 to 3 wt %, based on the copolyester. When the amount is smaller than 0.1 wt %, an ultraviolet degradation preventing effect is small, while when it is larger than 5 wt %, the film formation property of the polyester deteriorates disadvantageously.

Further, the above composition constituting the polyester film of the present invention preferably substantially does not contain a resin component which is substantially incompatible with the copolyester. "Substantially does not contain" indicates 0 to 1 wt %, more preferably 0 to 0.5 wt %, based on the composition.

Thermal Shrinkage

The polyester film of the present invention shows a thermal shrinkage at 85° C. in longitudinal and transverse directions of not higher than 0.7%, preferably not higher than 0.6%, more preferably not higher than 0.5%, and a thermal shrinkage at 150° C. in the longitudinal and transverse directions of not higher than 5.0%, preferably not higher than 4.5%, more preferably not higher than 4.0%. As for the balance of the thermal shrinkages, the ratio of (thermal shrinkage at 85° C. in the longitudinal direction)/

(thermal shrinkage at 85° C. in the transverse direction) is preferably within a range of 1.0 to 3.0 in terms of absolute value. When the ratio exceeds this range, the film is liable to wrinkle disadvantageously, even if the thermal shrinkages show the above values.

Thickness

The thickness of the polyester film of the present invention is preferably 25 to 250 μm, more preferably 30 to 220 μm, particularly preferably 40 to 200 μm. When the thickness is smaller than 25 μm, light reflectance lowers, while when the thickness is larger than 250 μm, it is difficult to expect an improvement in the reflectivity disadvantageously.

Optical Properties

The light reflectance of the polyester film of the present invention is not lower than 90%, preferably not lower than 92%, more preferably not lower than 94%, in terms of average reflectance at a wavelength of 400 to 700 nm. The reflectance can be achieved by the above constitution. Without the reflectance, satisfactory reflection efficiency cannot be attained when the film is used as a reflecting plate.

Further, the polyester film of the present invention preferably shows an optical density of at least 1.2 and an average of absolute regular reflectances in a wavelength range of 400 to 700 nm of at least 2.0.

Layer Structure

As described above, the polyester film of the present invention may be a film comprising a single layer or a film comprising a plurality of layers. When the polyester film comprises a plurality of layers, it may be constituted by two layers, e.g., a layer A and a layer B, or three layers, e.g., a layer A, a layer B and a layer A or a layer A, a layer B and a layer C, for example. Further, the polyester film may be constituted by four or more layers. In consideration of ease of preparation and effects, a single-layer form, a two-layer form, and a three-layer form comprising layers A/B/A are particularly suitable. In addition, other layers for imparting other functions may be laminated on one or both surfaces of the film to form a laminated film. Illustrative examples of the other layers include a transparent polyester film, a thin metallic film, a hard coat layer, and an ink reception layer.

Production Method

Hereinafter, an example of a production method when the polyester film is a laminated film comprising a plurality of layers will be described. A single-layer polyester film can also be produced in accordance with this method.

To produce the laminated film, a laminated unstretched film is produced by a simultaneous multilayer extrusion method using a feed block. To be more specific, a molten polymer forming the layer A and a molten polymer forming the layer B are laminated in the order of the layer A, the layer B and the layer A by use of the feed block and extruded from a die. At that time, the polymers laminated by use of the feed block maintain a laminated form. The sheet extruded from the die is cooled and solidified on a casting drum to form an unstretched laminated film.

The stretchable laminated film in the unstretched state is stretched in the longitudinal direction by roll heating, infrared heating or the like to obtain a longitudinally stretched film. This stretching is preferably carried out by taking advantage of the difference in peripheral velocity between two or more rolls. The stretch temperature is a temperature higher than the glass transition point (Tg) of the polyester, preferably a temperature higher than the Tg by 20 to 40° C. Although the stretch ratio varies depending on properties required for the film, it is preferably 2.5 to 4.0 times, more preferably 2.8 to 3.9 times. When it is smaller than 2.5 times, non-uniformity in the thickness of the film becomes great, so that a good film cannot be obtained, while when it is larger than 4.0 times, ruptures are liable to occur during film production disadvantageously.

The longitudinally stretched film is then subjected to transverse stretching, heat setting and thermal relaxation consecutively to form into a biaxially oriented film. It is advantageous that these treatments are carried out while the film is running. The transverse stretching treatment is preferably started from a temperature higher than the glass transition point (Tg) of the polyester by 10° C. or higher and ended at an elevated temperature higher than the Tg by (10 to 70)° C. Although the temperature in the transverse stretching process may be increased continuously or stepwise (successively), it is generally increased successively. For example, the temperature is increased by dividing the transverse stretching zone of a tenter into multiple zones in the film running direction and flowing a heating medium of a given temperature in each zone. Although the transverse stretch ratio varies depending on properties required for the film, it is preferably 2.5 to 4.5 times, more preferably 2.8 to 3.9 times. When it is smaller than 2.5 times, non-uniformity in the thickness of the film becomes great, so that a good film cannot be obtained, while when it is larger than 4.5 times, ruptures are liable to occur during film production disadvantageously.

The transversely stretched film is preferably heat-treated at a temperature lower than the melting point (Tm) of the polyester by 20 to 80° C., i.e., (Tm−20 to 80)° C., at a constant width or a decrease in width of not higher than 10%, with both sides thereof held, to lower the thermal shrinkage. When the heat treatment temperature is higher than the above temperature, the flatness of the film deteriorates, and non-uniformity in thickness becomes great. Further, when the heat treatment temperature is lower than (Tm−80)° C., the thermal shrinkage may become high. Further, in the course of restoring the temperature of the heat-set film to room temperature, it is preferred to cut off both sides of the held film and adjust the take-up speed in the film longitudinal direction to relax the film in the longitudinal direction, so as to adjust a thermal shrinkage level in the range lower than or equal to (Tm−20 to 80)° C. Means for relaxing the film is to adjust the speeds of rolls at the outlet of the tenter. To relax the film, the speeds of the rolls are slowed down, by preferably 0.1 to 1.2%, more preferably 0.2 to 1.0%, particularly preferably 0.3 to 0.8%, with respect to the film line speed of the tenter. By this relaxation, the thermal shrinkage in the longitudinal direction can be adjusted. As for the thermal shrinkage in the transverse direction of the film, a desired thermal shrinkage can be obtained by reducing the width in the course of cutting off both sides.

According to the present invention, a white polyester film can be provided that retains a practically satisfactory reflection performance with respect to the visible light range, can undergo stable film production even when inorganic fine particles are added in high concentration and is stable against a dimensional change caused by heat generated from a light source. The polyester film according to the present invention is the most suitable as a light reflecting plate, such as the back sheet of a solar battery, the reflecting plate of a flat panel display, e.g., a liquid crystal display or an internally illuminating billboard, or the reflecting plate of a printing record reception sheet.

EXAMPLES

Hereinafter, the present invention will be further described with respect to Examples. Property values were measured in accordance with the following methods.

(1) Film Thickness

The thickness of film sample was measured at 10 points by an electric micrometer (K-402B of Anritsu Corporation), and the average was taken as the thickness of the film.

(2) Thickness of Each Layer

A triangle was cut out of a film sample, fixed to an embedding capsule and embedded in an epoxy resin. Then, the embedded sample was sliced in the longitudinal direction by a microtome (ULTRACUT-S) to obtain a thin film slice having a thickness of 50 nm. The slice was then observed and photographed by use of a transmission electron microscope at an accelerating voltage of 100 kv. The thickness of each layer was determined from the photograph to determine the average thickness.

(3) Total Light Relative Reflectance

An integrating sphere was attached to a spectrophotometer (UV-3101PC of Shimadzu Corporation), and total light relative reflectance when a $BaSO_4$ white plate was 100% was measured at 400 to 700 nm. Reflectance was read from the measured values at an interval of 2 nm. The average of the obtained values was taken as the average of total light relative reflectance. The average was evaluated based on the following criteria.

◯: Reflectance is 90% or higher in all measurement areas.
Δ: Average reflectance is 90% or higher in measurement areas, and reflectance is lower than 90% in some measurement areas.
x: Average reflectance is lower than 90% in all measurement areas.

(4) Absolute Regular Reflectance

An absolute reflectance measuring device (ASR3105 of Shimadzu Corporation) was attached to a spectrophotometer (UV-3101PC of Shimadzu Corporation), and the absolute regular reflectance was measured at 400 to 700 nm at an incidence of 5°. Reflectance was read from the measured values at an interval of 2 nm. The average of the obtained values was taken as the average of absolute regular reflectance.

(5) Optical Density

The V (Visual) optical density in three primary colors of film sample was measured by use of an optical densitometer (product of X-Rite Co., Ltd., trade name "TR-310").

(6) Stretchability

A film was produced by stretching at a longitudinal stretch ratio of 3.4 times and a transverse stretch ratio of 3.6 to 3.7 times, and it was evaluated based on the following criteria whether the film could be produced stably.

◯: A film can be produced stably for 1 hour or longer.
x: Ruptures occur within 1 hour, and stable film production is impossible.

(7) Thermal Shrinkage

A film sample was kept in an oven set at 85° C. and 150° C. in an atonic state for 30 minutes, the distance between reference points between before and after the heat treatment was measured, and thermal shrinkages (thermal shrinkage at 85° C. and thermal shrinkage at 150° C.) were calculated by use of the following formula.

Thermal Shrinkage %=((L0−L)/L0)×100

L0: Distance between reference points before heat treatment
L: Distance between reference points after heat treatment (8) Glass Transition Point (Tg) and Melting Point (Tm)

The glass transition point (Tg) and the melting point (Tm) were measured by means of a differential scanning calorimeter (TA instruments 2100 DSC) at a temperature increasing rate of 20 m/min.

Examples 1 to 4

Inorganic fine particles shown in Table 1 were added to copolyesters shown in Table 1 and fed to two extruders heated at 280° C. Layer A polymers and layer B polymers were merged by use of a three-layer feed block so as to form an A/B/A structure and molded into sheets from dies with the laminated state retained. Then, the sheets were cooled and solidified on a cooling drum having a surface temperature of 25° C. so to obtain unstretched films. The unstretched films were transferred to rolls heated at 85 to 98° C., stretched to 3.4 times in the longitudinal direction, and cooled by rolls of 25° C. Subsequently, the longitudinally stretched films were transferred to a tenter with both sides thereof held by clips and stretched to 3.7 times in the direction (transverse direction) perpendicular to the longitudinal direction in an atmosphere heated at 120° C. Then, the resulting films were heat-set in the tenter at temperatures shown in Table 2, subjected to relaxation in the longitudinal direction and width adjustment in the transverse direction at temperatures shown in Table 2, and cooled to room temperature so as to obtain biaxially oriented films. Physical properties when these films were used as reflecting plates are as shown in Table 2.

Examples 5 and 6

Films were obtained in the same manner as in Example 1 except that the layer structure of the film in Examples 1 to 4 was changed to a single layer and conditions shown in Tables 1 and 2 were used. To form a single-layer structure, only one extruder was used.

Comparative Example 1

A film was produced in the same manner as in Example 1 except that conditions shown in Tables 1 and 2 were used. The film had poor thermal shrinkage since it was not subjected to relaxation in longitudinal and transverse directions.

Comparative Example 2

A film was produced in the same manner as in Example 1 except that conditions shown in Tables 1 and 2 were used. The film had a low content of inorganic fine particles and poor reflectance.

Comparative Example 3

A film was produced in the same manner as in Example 1 except that conditions shown in Tables 1 and 2 were used. The film had an insufficient thickness and poor reflectance.

Comparative Example 4

A film was produced in the same manner as in Example 1 except that conditions shown in Tables 1 and 2 were used. Because a non-copolymerized polymer was used, stretchability was extremely low, and ruptures often occurred during film production. Consequently, a film could not be produced.

Comparative Example 5

A film was produced in the same manner as in Example 1 except that conditions shown in Tables 1 and 2 were used. Because the low proportion of the copolymerized component caused deterioration in stretchability, ruptures often occurred during film production. Consequently, physical properties could not be measured.

Comparative Example 6

A film was produced in the same manner as in Example 1 except that a composition prepared by mixing 14 wt % of calcium carbonate into a polyethylene terephthalate was used for the layer A and a composition prepared by mixing 10 wt % of polymethylpentene resin which was an incompatible resin and 1 wt % of polyethylene glycol into a polyethylene terephthalate was used for the layer B. The results are shown in Tables 1 and 2. The results show poor reflectance.

TABLE 1

| | Film for Layer A | | | | | | |
|---|---|---|---|---|---|---|---|
| | | Copolymerized | | | Inorganic Fine Particles | | |
| | Polymer | Component | Proportion % | Kind | Added Amount/Average Particle Diameter (wt %/μm) | Tg °C. | Tm °C. |
| Ex. 1 | PET | IPA | 10 | Barium Sulfate | 5.0/1.2 | 76 | 226 |
| Ex. 2 | PET | CHDM | 8 | Calcium Carbonate | 5.0/1.2 | 75 | 230 |
| Ex. 3 | PET | NDC | 12 | Titanium Dioxide | 4.0/1.0 | 82 | 223 |
| Ex. 4 | PET | IPA | 12 | Barium Sulfate | 3.0/1.5 | 74 | 225 |
| Ex. 5 | — | — | — | — | — | — | — |
| Ex. 6 | — | — | — | — | — | — | — |
| C. Ex. 1 | PET | NDC | 10 | Titanium Dioxide | 7.5/1.5 | 75 | 226 |
| C. Ex. 2 | PET | IPA | 12 | Barium Sulfate | 3.0/1.5 | 76 | 226 |
| C. Ex. 3 | PET | NDC | 10 | Titanium Dioxide | 7.5/1.5 | 82 | 225 |
| C. Ex. 4 | PET | — | — | Titanium Dioxide | 7.5/1.5 | 77 | 256 |
| C. Ex. 5 | PET | IPA | 0.5 | Barium Sulfate | 3.0/1.5 | 77 | 253 |
| C. Ex. 6 | PET | — | — | Calcium Carbonate | 14/1.5 | 78 | 255 |

| | Film for Layer B | | | | | | Layer | Total |
|---|---|---|---|---|---|---|---|---|
| | | Copolymerized | | | Inorganic Fine Particles | | Configuration and Ratio of | Content of Fine |
| | Polymer | Component | Proportion % | Kind | Added Amount/Average Particle Diameter (wt %/μm) | Tg °C. | Tm °C. | Layer Thicknesses | Particles (wt %) |
| Ex. 1 | PET | IPA | 10 | Barium Sulfate | 40/1.2 | 76 | 226 | A/B/A = 10/80/10 | 33 |
| Ex. 2 | PET | CHDM | 8 | Calcium Carbonate | 50/1.2 | 75 | 230 | A/B/A = 20/60/20 | 32 |
| Ex. 3 | PET | NDC | 12 | Titanium Dioxide | 50/1.0 | 83 | 223 | A/B/A = 12/76/12 | 39 |
| Ex. 4 | PET | IPA | 12 | Barium Sulfate | 45/1.5 | 75 | 225 | A/B/A = 12/76/12 | 35 |
| Ex. 5 | PET | NDC | 12 | Titanium Dioxide | 45/1.5 | 83 | 224 | B = 100 | 45 |
| Ex. 6 | PET | IPA | 12 | Barium Sulfate | 45/1.5 | 74 | 225 | B = 100 | 45 |
| C. Ex. 1 | PET | NDC | 10 | Titanium Dioxide | 30/1.5 | 82 | 225 | A/B/A = 15/70/15 | 23 |
| C. Ex. 2 | PET | IPA | 12 | Barium Sulfate | 10/1.2 | 76 | 226 | A/B/A = 15/70/15 | 8 |
| C. Ex. 3 | PET | NDC | 10 | Titanium Dioxide | 30/1.5 | 83 | 225 | A/B/A = 15/70/15 | 23 |
| C. Ex. 4 | PET | — | — | Titanium Dioxide | 50/1.5 | 78 | 257 | A/B/A = 15/70/15 | 37 |
| C. Ex. 5 | PET | IPA | 0.5 | Barium Sulfate | 45/1.2 | 76 | 252 | A/B/A = 12/76/12 | 35 |
| C. Ex. 6 | PET | — | — | — | PMX Resin Added | 77 | 253 | A/B/A = 6/88/6 | 2 |

Ex.: Example,
C. Ex.: Comparative Example
PET: polyethylene terephthalate
NDC: naphthalenedicarboxylate
IPA: isophthalic acid
CHDM: cyclohexane dimethanol
PMX: polymethylpentene

TABLE 2

| | Longitudinal Stretch Ratio | Longitudinal Stretch Temperature (° C.) | Transverse Stretch Ratio | Transverse Stretch Temperature (° C.) | Heat Setting Temperature (° C.) | Relaxation Rate/Temperature of Both Cut Ends (%/° C.) | Width Adjustment Rate (%) |
|---|---|---|---|---|---|---|---|
| Ex. 1 | 3.4 | 95 | 3.7 | 120 | 210 | 0.5/130 | 2 |
| Ex. 2 | 3.4 | 90 | 3.7 | 120 | 210 | 0.4/120 | 1 |

TABLE 2-continued

| | Longitudinal Stretch Ratio | Longitudinal Stretch Temperature (° C.) | Transverse Stretch Ratio | Transverse Stretch Temperature (° C.) | Heat Setting Temperature (° C.) | Relaxation Rate/Temperature of Both Cut Ends (%/° C.) | Width Adjustment Rate (%) |
|---|---|---|---|---|---|---|---|
| Ex. 3 | 3.4 | 90 | 3.7 | 120 | 210 | 0.7/150 | 3 |
| Ex. 4 | 3.4 | 95 | 3.7 | 120 | 210 | 0.5/150 | 3 |
| Ex. 5 | 3.4 | 90 | 3.7 | 120 | 210 | 1.0/150 | — |
| Ex. 6 | 3.4 | 90 | 3.7 | 120 | 210 | 0.5/120 | 3 |
| C. Ex. 1 | 3.4 | 90 | 3.7 | 120 | 210 | — | — |
| C. Ex. 2 | 3.4 | 90 | 3.7 | 120 | 210 | 0.5/130 | 2 |
| C. Ex. 3 | 3.4 | 90 | 3.7 | 120 | 210 | 0.5/130 | 3 |
| C. Ex. 4 | 3.4 | 90 | 3.7 | 120 | 210 | 0.5/130 | 3 |
| C. Ex. 5 | 3.4 | 90 | 3.7 | 120 | 210 | 0.5/130 | 1 |
| C. Ex. 6 | 3.4 | 92 | 3.6 | 130 | 230 | — | — |

| | Temperature of Width Adjusted Portion (° C.) | Thickness after Biaxial Stretching (μm) | Relative Reflectance | Thermal Shrinkage at 85° C. (%) Longitudinal | Thermal Shrinkage at 85° C. (%) Transverse | Thermal Shrinkage at 150° C. (%) Longitudinal | Thermal Shrinkage at 150° C. (%) Transverse | Optical Density | Stretchability |
|---|---|---|---|---|---|---|---|---|---|
| Ex. 1 | 150 | 150 | ○ | 0.1 | 0.1 | 2.9 | 0.9 | 1.2 | ○ |
| Ex. 2 | 130 | 100 | ○ | 0.2 | 0.2 | 3.3 | 1.5 | 1.3 | ○ |
| Ex. 3 | 130 | 100 | ○ | 0.1 | 0.1 | 2.3 | 1.2 | 1.4 | ○ |
| Ex. 4 | 150 | 170 | ○ | 0.2 | 0.1 | 2.5 | 1.1 | 1.4 | ○ |
| Ex. 5 | — | 75 | ○ | 0.1 | 0.6 | 2.5 | 3.0 | 1.3 | ○ |
| Ex. 6 | 150 | 50 | ○ | 0.1 | 0.1 | 3.2 | 0.8 | 1.2 | ○ |
| C. Ex. 1 | — | 150 | ○ | 0.8 | 0.8 | 5.3 | 5.2 | 1.2 | ○ |
| C. Ex. 2 | 150 | 150 | X | 0.1 | 0.1 | 2.9 | 0.9 | 0.9 | ○ |
| C. Ex. 3 | 150 | 20 | X | 0.1 | 0.1 | 3.2 | 0.8 | 0.8 | ○ |
| C. Ex. 4 | 150 | — | — | — | — | — | — | — | X |
| C. Ex. 5 | 130 | — | — | — | — | — | — | — | X |
| C. Ex. 6 | — | 50 | X | 0.3 | 0.3 | 1.0 | 0.8 | 1.1 | ○ |

Ex.: Example,
C. Ex.: Comparative Example

The polyester film of the present invention can be suitably used for various printing record applications such as paper substitutes, i.e., cards, labels, seals, home delivery slips, image reception papers for video printers, ink-jet printers and image reception papers for bar-code printers, posters, maps, clean papers, display boards, white boards, thermal printing, offset printing, telephone cards, and IC cards. The polyester film of the present invention is the most suitably used as a base material of a reception sheet having high reflectance and excellent design and for advertisements of merchandises and stores and for internally illuminating billboards used for guide display boards at the station. Further, the polyester film of the present invention can constitute a base material for a reflecting plate with which a brighter screen can be obtained when a liquid crystal screen is lit by light. In addition, the polyester film of the present invention can be particularly suitably used for a base material for the reflecting plate of a liquid crystal display or the back sheet of a solar battery because it shows a small dimensional change caused by heat generated from a light source.

The invention claimed is:

1. A polyester film which comprises a composition comprising a copolyester and inorganic fine particles in an amount of 30 to 50% by weight based on the composition, the copolyester comprising terephthalic acid as a main dicarboxylic acid component, ethylene glycol as a main glycol component, and at least one member selected from the group consisting of isophthalic acid, naphthalenedicarboxylic acid and cyclohexane dimethanol as a copolymerized component, which has a thermal shrinkage at 85° C. in longitudinal and transverse directions of not higher than 0.7% and a thermal shrinkage at 150° C. in the longitudinal and transverse directions of not higher than 5.0%, which has an average reflectance at a wavelength of 400 to 700 nm of not lower than 90%, which has a thickness of 30 to 250 μm, and which is used as a reflecting plate of a flat panel display.

2. The film of claim 1, wherein the inorganic fine particles are at least one member selected from the group consisting of titanium oxide, barium sulfate, calcium carbonate and silicon dioxide.

3. The film of claim 1, wherein the composition comprises a resin incompatible with the copolyester in an amount of 1 wt % at most based on the composition.

4. The film of claim 1, which is a laminated film comprising two or more layers at least one of which comprises the composition comprising said copolyester and inorganic fine particles in an amount of 30 to 50% by weight based on the composition.

5. The film of claim 4, which is a laminated film that at least has:

a layer comprising the composition comprising said copolyester and inorganic fine particles in an amount of 30 to 50% by weight based on the composition and a layer comprising a composition which comprises a copolyester comprising terephthalic acid as a main dicarboxylic acid component, ethylene glycol as a main glycol component, and at least one member selected from the group consisting of isophthalic acid, naphthalenedicarboxylic acid and cyclohexane dimethanol as a copolymerized component and inorganic fine particles in an amount of 0 to 30% by weight based on the composition.

6. The film of claim 4, which has an optical density of at least 1.2 and an average of absolute regular reflectances in a wavelength range of 400 to 700 nm of at least 2.0.

7. The film of claim 1, which has a thickness of 40 to 200 μm.

8. The film of claim 7, wherein the average reflectance at a wavelength of 400 to 700 nm is not lower than 92%.

9. The film of claim 7, wherein the average reflectance at a wavelength of 400 to 700 nm is not lower than 94%.

10. The film of claim 1, wherein the average reflectance at a wavelength of 400 to 700 nm is not lower than 92%.

11. The film of claim 1, wherein the average reflectance at a wavelength of 400 to 700 nm is not lower than 94%.

* * * * *